Patented Feb. 18, 1947

2,416,156

UNITED STATES PATENT OFFICE 2,416,156

PRODUCTION OF HYDROGEN PEROXIDE

Gerhard A. Cook, Snyder, N. Y., assignor to The Linde Air Products Company, a corporation of Ohio No Drawing. Application October 7, 1942,
Serial No. 461,125

8 Claims. (Cl. 23—207)

The invention relates to the production of hydrogen peroxide and particularly to a new process for making this compound by the gas-phase oxidation of hydrocarbons.

It has long been known that many oxygen-containing compounds, including alcohols, acids and aldehydes, can be prepared by gas-phase oxidation, or partial combustion of hydrocarbon materials. Under certain oxidizing conditions organic peroxides have been found in the reaction product, and the detection of hydrogen peroxide has been reported. With respect to the latter compound, however, its recovery from the product of a hydrocarbon oxidation has been very uncertain, and the presence of hydrogen peroxide in this reaction, as heretofore conducted, has been transitory or in amounts entirely too small to be of importance for production purposes.

It is an object of this invention to provide a new and improved process for the thermal gas-phase oxidation of hydrocarbons, which is capable of producing purifiable hydrogen peroxide solutions in yields satisfactory for commercial production. Another object is to make hydrogen peroxide in a recoverable state by partial oxidation of ethane and propane gas.

The invention is based upon the finding of those particular, and most suitable, operating conditions in the reaction which are conducive to the formation of hydrogen peroxide, and its recovery from the reaction product. Generally speaking those conditions should be chosen which will limit the extent of oxidation of the hydrocarbon gas as nearly as possible to the over-all reaction

$$C_mH_n + O_2 \rightarrow C_mH_{n-2} + H_2O_2$$

This requires the correlation of many factors, among which the following are desirable to insure the best results.

Only saturated hydrocarbons should be used in the process, that is those having no double or triple carbon bonds, and which are reasonably free from impurities in the form of unsaturated compounds. There is indication that gases containing two or more carbon atoms are preferable, since tests made with methane have given only small yields of hydrogen peroxide, whereas reactions with ethane or propane have given very good results. Butane is satisfactory as a starting material, except that with this gas aldehydes are formed in the reaction in relatively large amounts, which makes the recovery of a pure hydrogen peroxide product more difficult. Gases other than straight chain paraffin hydrocarbons may also be suitable, provided they are of the saturated type, and such gases are intended to be included within the broader scope of the invention.

In the gas mixture fed to the reaction vessel the hydrocarbon gas should be in excess stoichiometrically over the oxygen present, and while the best gas proportions will vary with other conditions, particularly with the temperature and pressure, a volume ratio of hydrocarbon to oxygen greater than 2:1 is desirable. In operations at atmospheric pressure a maximum of 20% oxygen by volume is usually sufficient, but this can be decreased at higher pressures, or to as little as 2% oxygen at a gage pressure, for example, in the neighborhood of 135 pounds per square inch. In any case, the concentration of oxygen should be kept well below the point where the explosion limits are found. Pure oxygen, air, or other gases containing oxygen can be used, provided no deleterious substances are introduced into the reaction. Nitrogen can be present in predominating proportions with suitable modification in reaction conditions to accommodate such dilution, and water vapor may actually exert a favorable action, as will be later described.

A proper control of temperature is important and while this may be within the broad range of about 300° C. to 600° C., the temperature should not exceed the point at which all, or nearly all, of the gaseous oxygen is used up in the reaction zone. In fact the optimum temperature is usually from about 5° C. to 50° C. below such point, or within a range where only about 2% to 20% of the oxygen employed is reacted. The temperature must be correlated with other reaction conditions, and the preferred operating range can best be determined by a series of trials, in which gradually raised reactor temperatures are used, while maintaining other conditions constant. During these tests, analysis is made of the effluent gas for oxygen content, which, with measurement of the flow of oxygen to the reactor, will indicate the amount of this gas used up in the reaction. A determination of the total peroxide yield will then permit a calculation of the percentage of the used oxygen which is converted to peroxide. Operating conditions are then selected in which this latter percentage, hereinafter referred to as "efficiency," is as high as possible, preferably over 40%. Under such conditions most of the remaining used oxygen is changed to water, while the balance reacts to form oxides of carbon and organic by-products such as formaldehyde. The temperature at which the efficiency is highest is usually somewhat lower that that at which the greatest yield of total peroxide (per unit volume of gas passed through the reactor) is obtained. This is due to the fact that at higher temperatures side reactions take place to an increased degree. Tests as applied to the gases ethane and propane, under similar conditions except for temperature, have shown that the lower hydrocarbon requires a temperature above about 450° C. and usually between about 490° C. and 550° C., for a satisfactory peroxide yield, whereas propane gives good results at temperatures as low as 350° C. and up to 500° C.

Although this thermal hydrogen peroxide-producing reaction between oxygen and hydrocarbons is chiefly a homogeneous and not a surface-type of reaction, it has, nevertheless, been found that a relatively small amount of the proper kind of contact surface is important for obtaining the best yields. Apparently the surface has the effect of stopping the gaseous chain reactions before they go too far. Thus the intermediate oxidation product hydrogen peroxide can be isolated in substantial yields, instead of oxides of carbon and water which would be the main products if the reaction were entirely uninhibited by surfaces. In selecting the most suitable contact surfaces it is necessary to consider the physical properties of these materials, as well as their chemical nature, and with other factors equal, the smoother the surface the better are the results obtained. Porosity, and sharp irregularities in the surface are detrimental. Thus smooth ceramic materials, like glazed porcelain, vitreous "porcelain" enamel, fused silica, and types of silica-containing glass sufficiently refractory to withstand the reaction temperatures, will definitely promote and enhance peroxide yields, and can be used to make, line, or coat the reaction vessel in which the synthesis takes place. These surfaces can be further improved by washing with dilute hydrofluoric acid or by treatment with boric acid before use, and in the latter instance, preferably by fusing the boric acid on to the surface at a temperature of 650° C. or higher, provided the surface is sufficiently refractory to permit such fusing. The boric acid treated surface not only improves the peroxide yields, but makes them more reproducible and permanent.

In place of the boric acid, or in mixture therewith, borates of aluminum, ammonium, copper, lithium, nickel, sodium, manganese, silver, and zinc, applied to refractory glass, may also produce surfaces of suitable activity; and other favorable coatings have been made from mixtures of boric acid with oxides of beryllium, cerium, columbium, germanium, phosphorus, samarium, thorium, tin, titanium, and zinc; or mixtures of boric acid with ammonium silicotungstate, boron nitride, amorphous boron, and borotungstic acid. In all of these modified surface coating materials, however, it is believed that the favorable effects of the resulting surface are due largely to the presence of the fused boric acid or boric oxide. Metal oxides and borates which might be reduced to the metal in the presence of excess hydrogen should be avoided as the surface material, since contact of the hot reaction gases with metals, or with certain known oxidation catalysts like vanadium pentoxide, is harmful, tending to hasten thermal decomposition of hydrogen peroxide already formed, and to promote a surface reaction leading to the formation of water and oxides of carbon, rather than the peroxide-forming reaction. Carbon and graphite have also proved unsuitable for similar reasons.

As previously mentioned, certain diluent gases or vapors, incorporated in the essential gas reaction mixture, also aid in the reaction, and appear to exert a favorable effect, either through an action in the gas phase or by further modifying the contact surface, or both. Water vapor, for example, in amounts from 1% to 40%, has substantially improved the peroxide yields, when used in conjunction with smooth refractory surfaces.

A tubular reaction vessel is convenient, although the particular form of the reactor is not believed to be material. Vessels of refractory glass can be used, reinforced, if necessary, to withstand pressure, or metal vessels coated with porcelain enamel may be suitable. Treatment of the interior surface of the reactor with boric acid, or with the mixtures specified, may be accomplished in any suitable manner, and a packing of rings, tubes, or saddles surfaced in similar manner may be used, with careful and proper distribution of the packing pieces, and with avoidance of too great a surface area. Reaction tubes ranging from 21 to 47 mm. inside diameter have been successfully used, but at ordinary pressures the larger sized tubes should have some packing, in order to prevent the hydrocarbons from being oxidized to large extent to products which would contaminate the hydrogen peroxide, or to oxides of carbon, which would lower the efficiency of oxygen and hydrocarbon utilization.

The pressures employed in the reaction may vary from less than atmospheric to as high as can be conveniently handled, and within a range from about 1 to 10 atmospheres good peroxide yields have been obtained. It has been found, however, that partial pressures of the hydrocarbon and oxygen should, for the highest yields, not exceed one to three atmospheres absolute pressure, as higher partial pressures of these active components of the gaseous mixture lead to increased formation of oxides of carbon and water. When the active ingredients are diluted with nitrogen, oxides of carbon, steam or other inert gases, the total pressure may be raised to bring the partial pressure of the oxygen and hydrocarbon up to one atmosphere or thereabouts.

Preferred space velocities (volume of gas processed per volume of reaction space per unit time) will vary with the pressure, and with the type of reaction vessel employed, but in general, the greater the pressure and the smaller the diameter of the reaction vessel, the higher will be the space velocity that may be used. Space velocity is not, however, as critical a variable as temperature, and the process has been successfully operated within the range of about 290 to 3000 liters per liter of reaction space per hour. This converted to reaction time means that the reacting gases are in contact with the reaction zone for a period of only a few seconds, or approximately from about 0.5 to 6 seconds.

The following examples, taken from many tests of the invention, are further illustrative of the preferred operation of this process.

Example 1

A mixture of commercial ethane (containing 2% to 4% ethylene) and oxygen was passed continuously, for a period of 278 hours, through a silica glass tube of 21 mm. inside diameter. This tube was of a composition containing about 20% alumina, and had a coating of boric acid applied to the inner surface. Heating of a 32 inch length of the tube was accomplished by means of a stirred molten salt bath, which permitted close control of high temperatures. The gas mixture was passed into the reactor at a rate of 6 cu. ft. per hour (metered at 25° C. and 1 atmosphere pressure) and at atmospheric pressure, the oxygen content of the mixture being varied between 10% and 20%. The effluent gas was bubbled through water, which was replaced periodically, and the total peroxide content determined. Over the 278 hours running time, at temperatures from about 515° C. to 530° C. the average yield of total peroxides (calculated as hydrogen peroxide) was about 8 milligrams per liter (at 0° C. and 1 atmosphere) of gas passed through the reactor, and an average of about 35% to 40% of the oxygen used up was changed to peroxide. Over 80% of the ethane which reacted was converted to ethylene. The optimum temperature was found to be 522° C.–524° C. When the input gas contained 20% oxygen, it was found best to operate so that the effluent gas, after condensation of the water and hydrogen peroxide, contained about 18 to 18.5% oxygen.

Example 2

A mixture of 15% oxygen and 85% commercial ethane was preheated and passed into a reactor at atmospheric pressure and at a rate of 40 cu. ft. per hour. The reaction vessel in this instance consisted of an ordinary "Pyrex" glass tube of 47 mm. inside diameter, with an inner surface coating of boric acid. Inserted in this tube, and functioning substantially as a packing, was another 21 mm. tube of 20% alumina glass, the latter tube being coated both inside and out with boric acid. With a 14 inch length of the reactor held at a temperature of about 527° C., peroxides were formed at the rate of 8 to 12 milligrams per liter of introduced gas, with an efficiency (oxygen used converted to peroxide) ranging from 28% to 35%.

Example 3

A mixture of 85% propane and 15% oxygen was bubbled through water at 50° C., and then passed under atmospheric pressure into a reactor at the rate of 6 cu. ft. per hour, the reactor being similar to the one described in Example 1. The temperature in this test was maintained at 474° C. to 477° C., producing peroxides at a yield of 9 to 14 milligrams per liter of gas, with an efficiency ranging from 30% to 60%.

Example 4

A mixture of 80% ethane and 20% oxygen was passed, at atmospheric pressure, into a tube reactor of the type described in Example 1. At a temperature of 522° C. the yield of peroxides was 7.8 milligrams per liter of the introduced gas mixture (measured at standard conditions). The same gas mixture was then bubbled through water kept at about 50° C. before entering the reactor, and the yield immediately was raised to 10.7 milligrams per liter. At the same time the efficiency of oxygen utilization rose from about 35% to 60%.

Example 5

A mixture of 90% propane and 10% oxygen was passed into a 20 mm. inside diameter unpacked silica glass tube which had been previously washed with dilute hydrofluoric acid. A low space velocity, 290 liters per liter of reaction space, was used. At a temperature of 385° C. in the molten salt bath heating the tube, a yield of 13.2 milligrams of peroxide per liter was obtained.

Example 6

A mixture of 92% ethane and 8% oxygen was passed through a 20 mm. inside diameter silica glass tube packed with ⅜ inch ceramic Raschig rings. The inner surface of the tube, and the packing rings, were all coated with boric acid. The gases were partly preheated before entering the reactor, which was two feet long, and the gas flow was 20 cu. ft. per hr., measured at standard conditions. With a gage pressure of 15 lbs. per sq. in., and a temperature of 525° C., a yield of 4.9 milligrams of peroxide was obtained, with an efficiency of oxygen utilization of 39%.

Example 7

To simulate an operation in which air is used as the oxygen source, and the hydrocarbon, oxygen and residual nitrogen are recycled with as small a purge as possible, a test was made with a gas mixture of 90% nitrogen (to represent accumulated inert ingredients), 6.7% ethane, and 3.3% oxygen. This mixture was passed into a reactor like the one of Example 1, at a pressure of 135 lbs. per sq. in. gage, and with the molten salt heating bath held at a temperature of 505° C. to 508° C. The sum of the partial pressures of the ethane and oxygen was thus about 1 atmosphere absolute. Peroxides were produced with a yield of 0.79 milligram per liter, with an efficiency of oxygen utilization of about 30%. Calculated on the basis of the ethane and oxygen alone, the yield was 7.9 milligrams of peroxide per liter, or about the same as though the gas mixture had been used at atmospheric pressure without the nitrogen.

It will be understood that the above examples are merely illustrative, and that many modifications in the complete procedure shown may be made within the broader scope of the invention. Although the proportion of the hydrocarbon and oxygen gases actually converted to useful products in a single pass through the reactor is low, the gases can be recycled after the desirable products have been removed from the effluent reactor gas stream. Suitable addition of make-up gas can be added as needed, and purging will be necessary to maintain suitable low concentrations of deleterious gas diluents.

It so happens that the conditions most suitable to the production of hydrogen peroxide, are also those very favorable to the forming of unsaturated compounds from the starting hydrocarbon gas, and I have found that as high as 80% to 90% or more of the hydrocarbon gas that reacts, is changed to one or more unsaturated hydrocarbons. For example, oxidation of ethane produces ethylene, whereas oxidation of propane produces propylene and some ethylene. Thus the process also efficiently produces unsaturated hydrocarbons, which may be absorbed or thermally separated from the effluent gas stream after the more readily condensible products of the reaction have been removed.

The particular manner of recovering the hydrogen peroxide from the complete reaction product is of no direct concern to the present invention, and there are a number of ways in which this can be accomplished. In addition to the unsaturated hydrocarbons above mentioned, formaldehyde, olefine oxides, and minor amounts of organic peroxides, or other organic by-products, may be contained in the initial reaction product. A substantial part of these impurities can be separated from the hydrogen peroxide by condensing or absorbing the latter from the vapor leaving the reactor, in a manner, and at a temperature, (preferably 50° C. to 70° C.) which will allow at least part of the formaldehyde and other organic products to remain in the gas stream, from which they can later be recovered separately before recycling the gas to the reactor. The crude hydrogen peroxide solution thus obtained has many valuable uses without additional treatment, or it can be further purified if desired.

As indicated heretofore, the treatment of the interior reaction vessel surface with boric acid, boric oxide, or the borates mentioned, may be effected in any suitable manner. Application of boric acid can be made with an aqueous solution of the acid, or a suspension thereof in an organic solvent such as acetone; or boric acid can be formed in situ by the hydrolysis of ethyl borate with steam or by the pyrolysis of methyl borate. Both high-temperature fused coatings and those merely dried have produced good results. When boric acid is applied to a ceramic base, and then heated to 650° C. or above, the resulting surface film is probably in part a borosilicate, or with an alumina-containing glass, partly a boroaluminate. However formed, it is believed that the additive surface film gradually assumes a certain state of hydration determined by the conditions of use for peroxide production, and it will be understood that where these coatings or films are referred to, a degree of hydration is assumed in accordance with the conditions to which they are subjected. The actual extent of hydration will be largely determined by the temperature, and by the partial pressure of the water vapor present in the gas adjacent to the surface, said water vapor occurring either by reaction between the hydrogen and oxygen, or through introduction with the initial reaction gas mixtures.

In my copending applications, Serial No. 415,647, filed October 18, 1941, now Patent No. 2,368,640, granted February 6, 1945, and Serial No. 466,829, filed November 24, 1942, now Patent No. 2,368,806, granted February 6, 1945, I have disclosed other aspects of the subject matter contained herein.

I claim:

1. A process for producing hydrogen peroxide which comprises subjecting a gaseous mixture of a saturated hydrocarbon and oxygen-containing gas to a temperature from about 300° C. to 600° C. in a reaction vessel having a substantially smooth, non-porous gas-contacting interior surface coated in a continuous layer with a member of the group consisting of boric acid and boric oxide, holding said temperature below the point at which all the gaseous oxygen introduced to the reaction vessel is reacted, and recovering hydrogen peroxide from the reaction products.

2. A process for producing hydrogen peroxide which comprises subjecting a gaseous mixture of a saturated hydrocarbon and oxygen-containing gas to a temperature from about 300° C. to 600° C. in a reaction vessel having a substantially smooth, non-porous gas-contacting interior surface coated in a continuous layer with a member of the group consisting of boric acid and boric oxide, holding said temperature within a range where only about 2% to 20% of the oxygen introduced to the reaction vessel is reacted, maintaining a volume ratio of hydrocarbon to oxygen in the gas mixture of at least 2:1 and a reaction time of 0.5 to 6.0 seconds, and recovering hydrogen peroxide from the reaction products by condensation at a temperature of about 50° C. to 70° C.

3. A process for producing hydrogen peroxide which comprises subjecting a gaseous mixture of ethane and oxygen-containing gas to a temperature above 450° C. in a reaction vessel having a substantially smooth, non-porous gas-contacting interior surface coated in a continuous layer with a member of the group consisting of boric acid and boric oxide, holding said temperature within a range where only about 2% to 20% of the oxygen introduced to the reaction vessel is reacted, maintaining a volume ratio of ethane to oxygen in the gas mixture of at least 2:1 and a reaction time of 0.5 to 6.0 seconds, and recovering hydrogen peroxide from the reaction products by condensation.

4. A process for producing hydrogen peroxide which comprises subjecting a gaseous mixture of propane and oxygen-containing gas to a temperature above 360° C. in a reaction vessel having a substantially smooth, non-porous gas-contacting interior surface coated in a continuous layer with a member of the group consisting of boric acid and boric oxide, holding said temperature within a range where only about 2% to 20% of the oxygen introduced to the reaction vessel is reacted, maintaining a volume ratio of propane to oxygen in the gas mixture of at least 2:1 and a reaction time of 0.5 to 6.0 seconds, and recovering hydrogen peroxide from the reaction products by condensation.

5. A process for producing hydrogen peroxide which comprises passing a gaseous mixture of a lower saturated hydrocarbon, oxygen-containing gas, and water vapor through a reaction vessel, said vessel having a gas contacting interior surface coated in a continuous layer with a member of the group consisting of boric acid and boric oxide, maintaining said gaseous mixture at a temperature from about 300° C. to 600° C. and below the point at which all the gaseous oxygen introduced to the reaction vessel is reacted, controlling the relative volume of hydrocarbon and oxygen in the gas mixture to a ratio of at least 2:1, and recovering the hydrogen peroxide from the reaction products.

6. A process for producing hydrogen peroxide which comprises passing a gaseous mixture of a lower saturated hydrocarbon and oxygen-containing gas through a reaction vessel, the gas contacting surface of said vessel having a fused coating forming a continuous layer therewith composed of a member of the group consisting of boric acid and boric oxide, maintaining said gaseous mixture at a temperature from about 300° C. to 600° C. and below the point at which all the gaseous oxygen introduced to the reaction vessel is reacted, controlling the relative volume of hydrocarbon and oxygen in the gas mixture to a ratio of at least 3:1, and recovering the hydrogen peroxide from the reaction products.

7. A process for producing hydrogen peroxide which comprises passing a gaseous mixture of ethane and oxygen-containing gas through a reaction vessel, the gas contacting surface of said vessel having a fused coating forming a continuous layer therewith composed of a member of the group consisting of boric acid and boric oxide, maintaining said gaseous mixture at a temperature between about 490° C. and 550° C., controlling the relative volume of ethane and oxygen in the gas mixture to a ratio of at least 3:1 and a space velocity which provides a reaction time of about 0.5 to 6.0 seconds, and recovering hydrogen peroxide from the reaction products by condensation.

8. A process for producing hydrogen peroxide which comprises passing a gaseous mixture of propane and oxygen-containing gas through a reaction vessel, the gas contacting surface of said vessel having a fused coating forming a continuous layer therewith composed of a member of the group consisting of boric acid and boric oxide, maintaining said gaseous mixture at a temperature between about 350° C. and 500° C., controlling the relative volume of propane and oxygen in the gas mixture to a ratio of at least 3:1, and a space velocity which provides a reaction time of about 0.5 to 6.0 seconds, and recovering hydrogen peroxide from the reaction products by condensation.

GERHARD A. COOK.

REFERENCES CITED

The following references are of record in the file of this patent:

UNITED STATES PATENTS

| Number | Name | Date |
| --- | --- | --- |
| 1,392,886 | Bibb | Oct. 4, 1921 |
| 1,991,344 | Burke | Feb. 12, 1935 |
| 1,978,621 | Burke | Oct. 30, 1934 |
| 2,018,994 | Burke | Oct. 29, 1935 |
| 2,007,116 | Walker | July 2, 1935 |
| 2,186,688 | Walker | Jan. 9, 1940 |

FOREIGN PATENTS

| Number | Country | Date |
| --- | --- | --- |
| 473,344 | British | Oct. 11, 1937 |
| 473,294 | British | Oct. 11, 1937 |
| 8,582 | British | A. D. 1913 |

OTHER REFERENCES

Pease, "Journal American Chemical Society," vol. 51, pgs. 1839–1856 (1929), vol. 56, pgs. 2034–2038 (1934).

Gardner, "Chemical Synonyms and Trade Names," 1924, pg. 209. (Cpy. Div. 59.)

Searle, "Chemistry of Clays and Other Ceramic Materials" (1933), pgs. 415, 430, and 431, 2nd ed. (Copy in Div. 59.)